US012803440B2

(12) United States Patent
Jung et al.

(10) Patent No.: US 12,803,440 B2
(45) Date of Patent: Nov. 17, 2026

(54) THREE-LEVEL BUCK CONVERTER WITH MODIFIED TWO-LEVEL BUCK CONVERTER MODE OPERATION

(71) Applicant: QUALCOMM Incorporated, San Diego, CA (US)

(72) Inventors: Sanghwa Jung, Los Gatos, CA (US); Jiwei Chen, San Jose, CA (US); Christopher Lam, Milpitas, CA (US); Joseph Dale Rutkowski, Chandler, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 18/640,869

(22) Filed: Apr. 19, 2024

(65) Prior Publication Data

US 2025/0330087 A1 Oct. 23, 2025

(51) Int. Cl.
*H02M 3/158* (2006.01)

(52) U.S. Cl.
CPC .................................. *H02M 3/158* (2013.01)

(58) Field of Classification Search
CPC ............. H04B 2215/069; H02M 1/32; H02M 1/081–084; H02M 1/0006; H02M 3/156; H02M 3/158; H02M 3/1588; H02M 3/155; H02M 3/1582; H02M 3/157; H02M 3/1563; H02M 3/1584
See application file for complete search history.

(56) References Cited

U.S. PATENT DOCUMENTS 10,651,736 B1 5/2020 Lazaro et al.
11,228,256 B2 * 1/2022 Zilio ................... H02M 1/0095
2021/0159795 A1 * 5/2021 Lin ....................... H02M 3/158
2023/0006555 A1 1/2023 Jung et al.

FOREIGN PATENT DOCUMENTS

KR 102526702 B1 4/2023

OTHER PUBLICATIONS

International Search Report and Written Opinion—PCT/US2025/020425—ISA/EPO—May 19, 2025.
Kopacz R., et al., "Medium Voltage Flying Capacitor DC-DC Converter With High-Frequency TCM-Q2L Control", IEEE Transactions on Power Electronics, Institute of Electrical and Electronics Engineers, USA, vol. 37, No. 4, Oct. 26, 2021, pp. 4233-4248, XP011895466, p. 4235-p. 4238, figures 1-5.

* cited by examiner

*Primary Examiner* — Bryan R Perez
(74) *Attorney, Agent, or Firm* — Patterson + Sheridan, L.L.P.

(57) ABSTRACT

Techniques and apparatus for regulating power in a power supply circuit with a three-level buck converter circuit are provided. One example power supply circuit generally includes (i) a three-level buck converter circuit including a switching node coupled to an inductive element and (ii) a control circuit coupled to the three-level buck converter circuit and configured to control the three-level buck converter circuit such that the switching node operates with more than two different constant voltage levels. One example method generally includes operating a three-level buck converter circuit including a switching node coupled to an inductive element such that the switching node operates with more than two different constant voltage levels.

18 Claims, 7 Drawing Sheets

THREE-LEVEL BUCK CONVERTER WITH MODIFIED TWO-LEVEL BUCK CONVERTER MODE OPERATION

TECHNICAL FIELD

Certain aspects of the present disclosure generally relate to electronic circuits and, more particularly, to a three-level buck converter circuit capable of modified two-level buck converter mode operation.

BACKGROUND

A voltage regulator ideally provides a constant direct current (DC) output voltage regardless of changes in load current or input voltage. Voltage regulators may be classified as linear regulators or switching regulators. While linear regulators tend to be relatively compact, many applications may benefit from the increased efficiency of a switching regulator. A linear regulator may be implemented by a low-dropout (LDO) regulator, for example. A switching regulator may be implemented, for example, by a switched-mode power supply (SMPS), such as a buck converter, a boost converter, a buck-boost converter, or a charge pump.

For example, a buck converter is a type of SMPS that may include: (1) a high-side switch coupled between a relatively higher voltage rail and a switching node, (2) a low-side switch coupled between the switching node and a relatively lower voltage rail, (3) and an inductor coupled between the switching node and a load. The high-side and low-side switches are typically implemented with transistors, although the low-side switch may alternatively be implemented with a diode.

Power management integrated circuits (power management ICs or PMICs) are used for managing the power scheme of a host system and may include and/or control one or more voltage regulators (e.g., buck converters and/or LDOs). A PMIC may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide the advantages described herein.

Certain aspects of the present disclosure provide a power supply circuit. The power supply circuit generally includes (i) a three-level buck converter circuit including a switching node coupled to an inductive element and (ii) a control circuit coupled to the three-level buck converter circuit and configured to control the three-level buck converter circuit such that the switching node operates with more than two different constant voltage levels.

Certain aspects of the present disclosure are directed to a method of regulating power. The method generally includes operating a three-level buck converter circuit including a switching node coupled to an inductive element such that the switching node operates with more than two different constant voltage levels.

Certain aspects of the present disclosure provide a power management integrated circuit (PMIC) comprising at least a portion of the power supply circuit described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
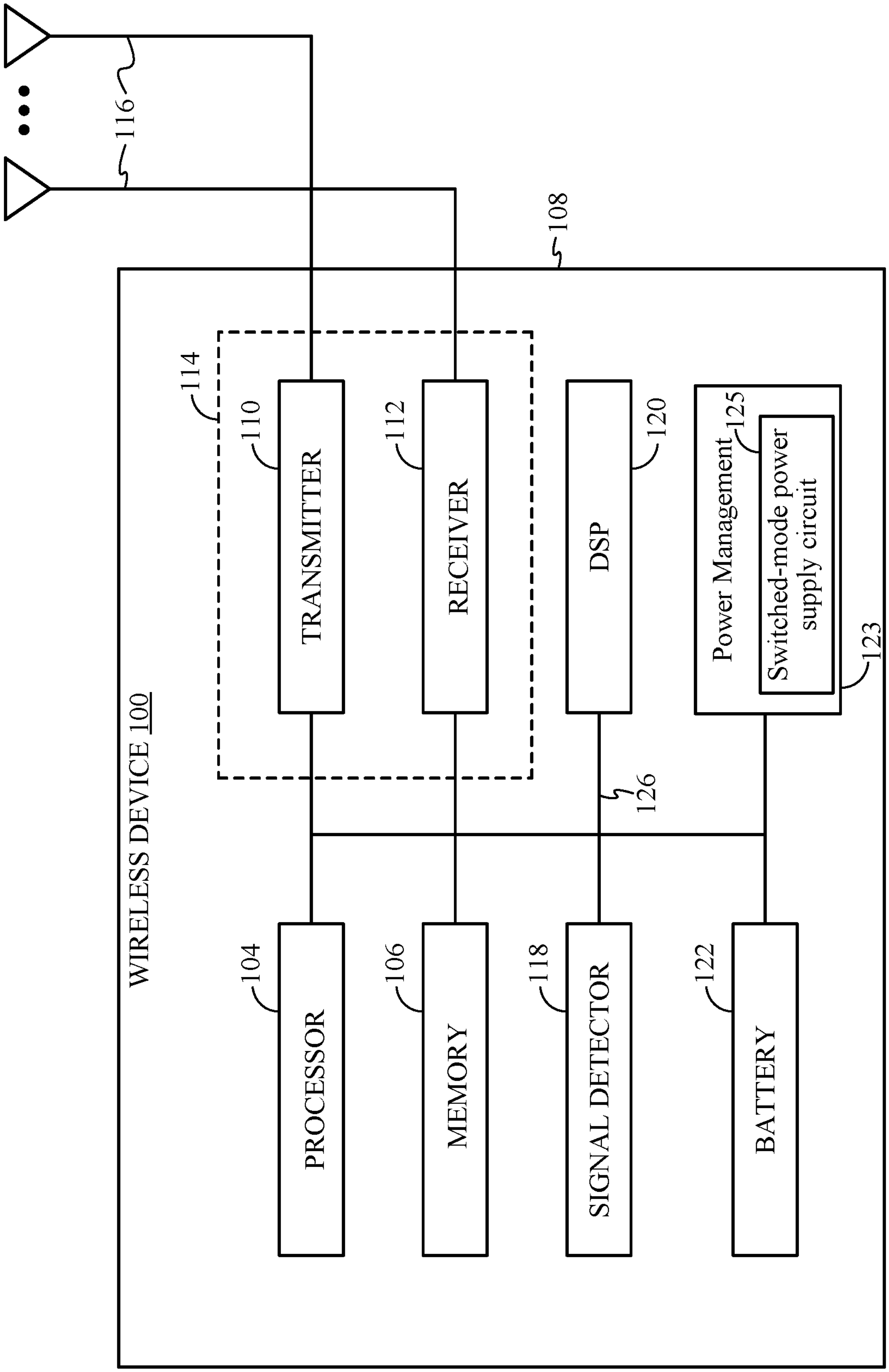
FIG. 1 illustrates a block diagram of an example device that includes a power supply system with at least one switched-mode power supply (SMPS) circuit, in which aspects of the present disclosure may be practiced.

Certain aspects of the present disclosure provide a three-level buck converter circuit capable of modified two-level buck converter mode operation and techniques for regulating power using such a three-level buck converter circuit. An example power supply circuit may include a three-level buck converter circuit comprising a switching node coupled to an inductive element and a control circuit coupled to the three-level buck converter circuit. The control circuit may be configured to control the three-level buck converter circuit such that the switching node operates with more than two different constant voltage levels. By operating the three-level buck converter circuit in the modified two-level buck converter mode during light load conditions, for example, the peak inductor current and the inductor power loss may be reduced compared to conventional two-level buck converter modes for a three-level buck converter circuit.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word “exemplary” is used herein to mean “serving as an example, instance, or illustration.” Any aspect described herein as “exemplary” is not necessarily to be construed as preferred or advantageous over other aspects.

As used herein, the term “connected with” in the various tenses of the verb “connect” may mean that element A is directly connected to element B or that other elements may be connected between elements A and B (i.e., that element A is indirectly connected with element B). In the case of electrical components, the term “connected with” may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatus, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDAs), and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, an Internet of things (IoT) device, a wearable device, an augmented reality device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a transmitter 110 and a receiver 112 to allow transmission and/or reception, respectively, of data between the device 100 and a remote location. For certain aspects, the transmitter 110 and receiver 112 may be combined into a transceiver 114. One or more antennas 116 may be attached or otherwise coupled to a housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122, which may be used to power the various components of the device 100 (e.g., when another power source-such as a wall adapter or a wireless power charger—is unavailable). The battery 122 may comprise a single cell or multiple cells connected in series and/or in parallel. The device 100 may further include additional independent batteries (not shown). Each of the additional independent batteries may comprise a single cell or multiple cells connected in series and/or in parallel.

The device 100 may also include a power management system 123 for managing the power from the battery 122 (or batteries), a wall adapter, and/or a wireless power charger to the various components of the device 100. The power management system 123 may perform a variety of functions for the device such as DC-to-DC conversion, battery charging, power-source selection, voltage scaling, power sequencing, source mode power, etc. In certain aspects, the power management system 123 may include one or more power management integrated circuits (power management ICs or PMICs). The power management system 123 may also include one or more power supply circuits, which may include a switched-mode power supply circuit 125. The switched-mode power supply circuit 125 may be implemented by any of various suitable switched-mode power supply circuit topologies, such as a three-level buck converter, a divide-by-two (Div2) charge pump, or an adaptive combination power supply circuit. For certain aspects, the switched-mode power supply circuit 125 may include a three-level buck converter circuit, which may be capable of operating in a modified two-level buck converter mode, as described below.

The various components of the device 100 may be coupled together by a bus system 126, which may include a power bus, a control signal bus, and/or a status signal bus in addition to a data bus. Additionally or alternatively, various combinations of the components of the device 100 may be coupled together by one or more other suitable techniques.

Example Power Supply Scheme

Figure 2:
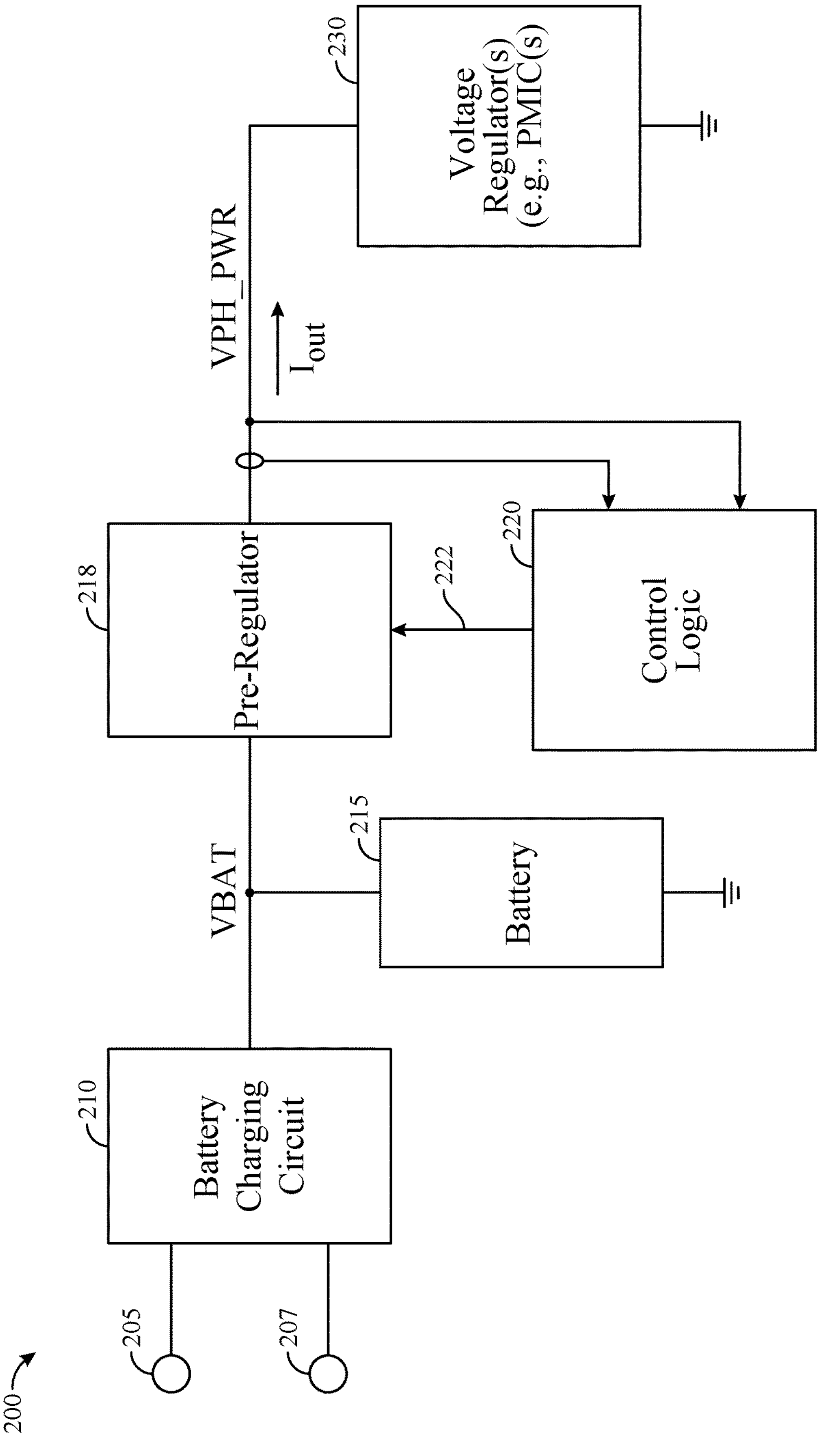
FIG. 2 is a block diagram of an example power supply scheme comprising a battery charging circuit, a battery circuit, and a pre-regulator for regulating power to one or more voltage regulators, in which aspects of the present disclosure may be practiced.

FIG. 2 is a block diagram of an example power supply scheme 200, in accordance with certain aspects of the present disclosure. The power supply scheme 200 includes a battery charging circuit 210, a battery circuit 215, a pre-regulator 218, and one or more voltage regulators 230. Control logic 220 may receive various inputs (e.g., voltage and/or current feedback signals) and may control the pre-regulator 218, the battery charging circuit 210, and/or the voltage regulators 230.

The battery charging circuit 210 may receive power from one or more ports (e.g., ports 205 and 207), and this received power may be converted and used to charge a battery or a battery pack in a battery circuit 215 of a portable device (e.g., a smartphone, tablet, and the like). For example, port 205 may be a Universal Serial Bus (USB) port for connecting to a wall adapter, whereas port 207 may be a wireless power port. The battery circuit 215 may include a single-cell or multi-cell-in-series battery (e.g., a two-cell-in-series, or 2S, battery). The battery circuit 215 may also include any protection circuitry, which may include switches implemented by transistors, for example. For certain aspects, the battery charging circuit 210, or at least a portion thereof, may reside in a PMIC in the device. The battery charging circuit 210 may comprise, for example, one or more switched-mode power supplies (e.g., a buck converter and/or a charge pump converter). For certain aspects, the battery charging circuit 210 may comprise two or more parallel charging circuits, each capable of charging the battery, which may be connected together and to the battery in an effort to provide fast charging of the battery. The parallel charging circuits may be configured so that these circuits do not adversely interfere with each other during battery charging (e.g., in a master-slave relationship). Charging circuits for a parallel charger may use buck converter topologies, such as a three-level buck converter topology. However, one or more of the buck converters may be replaced with a charge pump converter in some parallel charging circuits.

The pre-regulator 218 may receive power from the battery circuit 215 with a voltage VBAT (e.g., 7 to 9 V). Used to regulate power for the voltage regulators 230, the pre-regulator 218 may comprise, for example, one or more switched-mode power supplies (e.g., a buck converter, a charge pump converter, or an adaptive combination power supply circuit capable of switching therebetween). As described below, the control logic 220 may receive an indication of a current associated with the pre-regulator 218 (e.g., output current $I_{out}$) and an indication of the output voltage VPH_PWR (e.g., 3.3 to 4 V) from the pre-regulator 218. Based, at least in part, on these indications, the control logic 220 may output one or more control signals 222 to control the pre-regulator 218. For example, in the case of a three-level buck converter topology, the control logic 220 may output signals as inputs to the gate drivers for driving the power transistors to regulate the output voltage VPH_PWR. The one or more voltage regulators 230 may include one or more linear regulators and/or one or more switching regulators for generating smaller voltages (e.g., 1.2 to 3.3 V) from VPH_PWR. For certain aspects, the voltage regulators 230 may include core PMICs for the device.

Example Power Supply Circuit and Operation

As described above, a pre-regulator (e.g., the pre-regulator 218) may be implemented by a switched-mode power supply (e.g., a buck converter, a charge pump converter, or an adaptive combination power supply circuit capable of switching therebetween), which may be a single-phase or multi-phase converter. For certain aspects, a three-level buck converter may be utilized to implement a pre-regulator.

Figure 3:
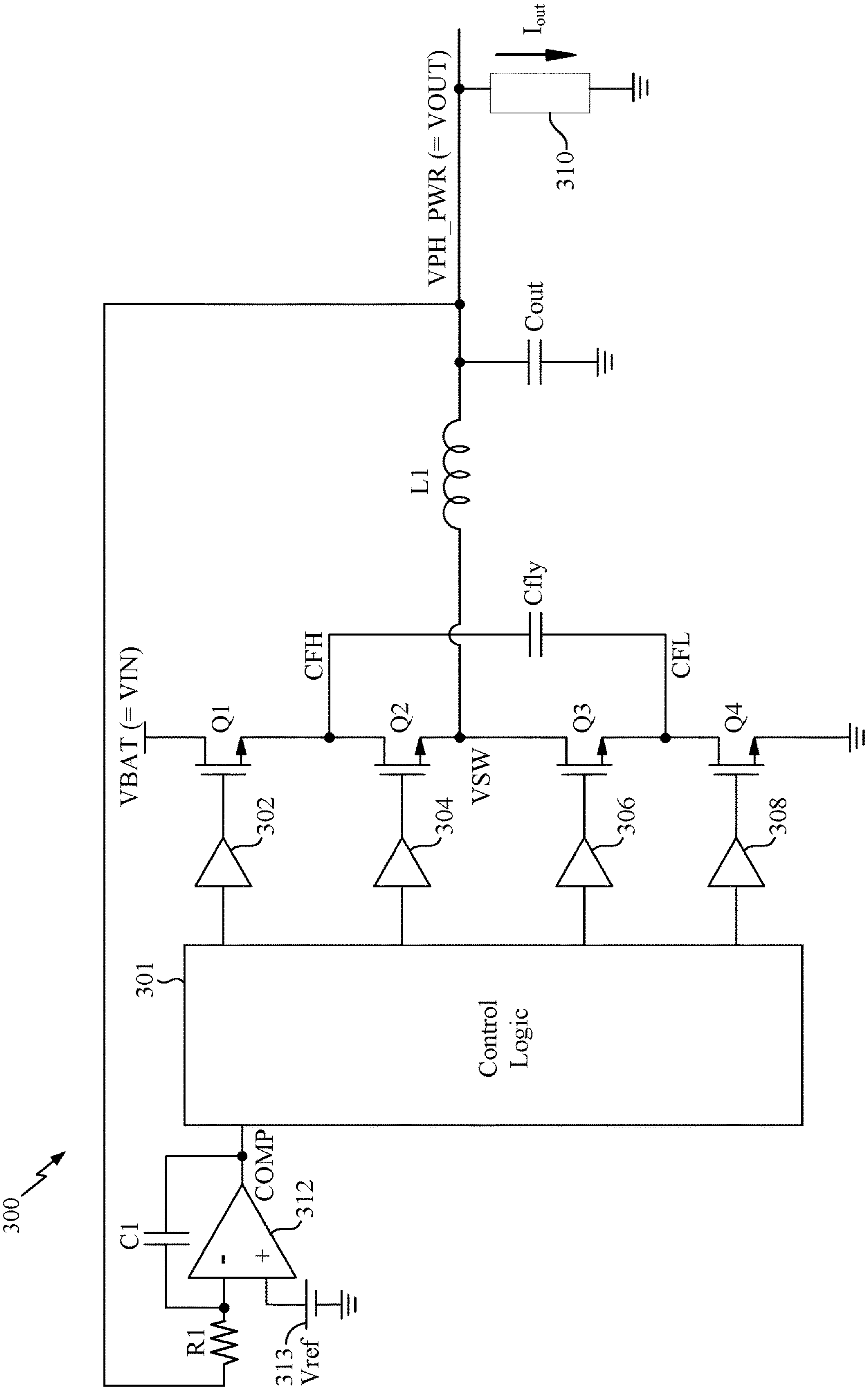
FIG. 3 is a circuit diagram of an example power supply circuit with a three-level buck converter, in which aspects of the present disclosure may be practiced.

A single-phase three-level buck converter topology (as illustrated in the power supply circuit 300 of FIG. 3) may include four switches (implemented by a first transistor Q1, a second transistor Q2, a third transistor Q3, and a fourth transistor Q4), a flying capacitive element Cfly, an inductive element L1, and one or more shunt capacitive elements (represented here by capacitor Cout). An output node (labeled "VPH_PWR" or "VOUT") of the power supply circuit 300 may be coupled to a shunt load 310. Output current $I_{out}$ of the power supply circuit 300 may pass through the shunt load 310, as is shown in FIG. 3. An adaptive combination power supply circuit may be realized by adding a switch (not shown) across the inductive element L1 of the three-level buck converter topology. With such a switch closed, the adaptive combination power supply circuit may function as a single-phase divide-by-two (Div2) charge pump converter.

Transistor Q2 may be coupled to transistor Q1 via a first node (labeled "CFH" for flying capacitor high node), transistor Q3 may be coupled to transistor Q2 via a second node (labeled "VSW" for voltage switching node), and transistor Q4 may be coupled to transistor Q3 via a third node (labeled "CFL" for flying capacitor low node). For certain aspects, the transistors Q1-Q4 may be implemented as n-type metal-oxide-semiconductor (NMOS) transistors, as illustrated in FIG. 3. In this case, the drain of transistor Q2 may be coupled to the source of transistor Q1, the drain of transistor Q3 may be coupled to the source of transistor Q2, and the drain of transistor Q4 may be coupled to the source of transistor Q3. The source of transistor Q4 may be coupled to a reference potential node (e.g., electrical ground) for the power supply circuit 300. The flying capacitive element Cfly may have a first terminal coupled to the first node and a second terminal coupled to the third node. The inductive element L1 may have a first terminal coupled to the second node and a second terminal coupled to the output node (labeled "VPH_PWR," but also referred to as "VOUT"), the one or more shunt capacitive elements, and the shunt load 310.

Control logic 301 may control operation of the power supply circuit 300 and may be the same or different from control logic 220 in FIG. 2. For example, control logic 301 may control operation of the transistors Q1-Q4 via output signals to the inputs of respective gate drivers 302, 304, 306, and 308. The outputs of the gate drivers 302, 304, 306, and 308 are coupled to respective gates of transistors Q1-Q4. During operation of the power supply circuit 300, the control logic 301 may cycle through four different phases, which may differ depending on whether the duty cycle is less than 50% or greater than 50%.

For certain aspects, the power supply circuit 300 may include one or more feedback circuits. The feedback circuits may sense the output voltage Vout from the output node and/or the output current $I_{out}$ delivered to the load 310, process the sensed voltage and/or current, and feed the processed signal(s) to the control logic 301. The control logic 301 may control operation of the power supply circuit 300 based on the processed signal(s). The feedback circuits may be implemented by any of various suitable circuits for sensing and processing voltage or current. In the example of FIG. 3, the feedback circuit for sensing the output voltage Vout includes an error amplifier 312, a voltage source 313, a resistive element (represented by resistor R1), and a capacitive element (represented by capacitor C1). As shown, the output (labeled "COMP") of the error amplifier 312 is coupled to the negative terminal of the error amplifier 312 via the capacitive element and to the control logic 301. The positive terminal of the error amplifier 312 is coupled to the output node VPH_PWR via the resistive element. The voltage source 313 may be tunable and may generate a reference voltage Vref for the error amplifier 312.

Operation of the power supply circuit 300 with a duty cycle of less than 50% is described first. In a first phase (referred to as a "charging phase"), transistors Q1 and Q3 are activated, and transistors Q2 and Q4 are deactivated, to charge the flying capacitive element Cfly and to energize the inductive element L1. In a second phase (called a "holding phase"), transistor Q1 is deactivated, and transistor Q4 is activated, such that the VSW node is coupled to the reference potential node, the flying capacitive element Cfly is disconnected (e.g., one of the Cfly terminals is floating), and the inductive element L1 is deenergized. In a third phase (referred to as a "discharging phase"), transistors Q2 and Q4 are activated, and transistor Q3 is deactivated, to discharge the flying capacitive element Cfly and to energize the inductive element L1. In a fourth phase (also referred to as a "holding phase"), transistor Q3 is activated, and transistor Q2 is deactivated, such that the flying capacitive element Cfly is disconnected and the inductive element L1 is deenergized.

Operation of the power supply circuit 300 with a duty cycle greater than 50% is similar in the first and third phases, with the same transistor configurations. However, in the second phase (called a "holding phase") following the first phase, transistor Q3 is deactivated, and transistor Q2 is activated, such that the VSW node is coupled to an input voltage node (labeled "VBAT," but also referred to as input node "VIN"), the flying capacitive element Cfly is disconnected, and the inductive element L1 is energized. Similarly in the fourth phase (also referred to as a "holding phase") with a duty cycle greater than 50%, transistor Q1 is activated, and transistor Q4 is deactivated, such that the flying capacitive element Cfly is disconnected and the inductive element L1 is energized.

Operating the Three-Level Buck Converter Circuit in a Two-Level Buck Converter Mode During certain modes, a current-sensing circuit may be sensing the load current and providing an indication of the sensed load current to the control logic (e.g., control logic 220 or 301). In some scenarios, the load current may decrease and fall below a light load entering threshold (e.g., 300 mA). When the sensed load current is determined to be lower than the light load entering threshold by the control logic, a power supply circuit may assume a light load condition and enter a two-level buck converter mode.

Figure 4A:
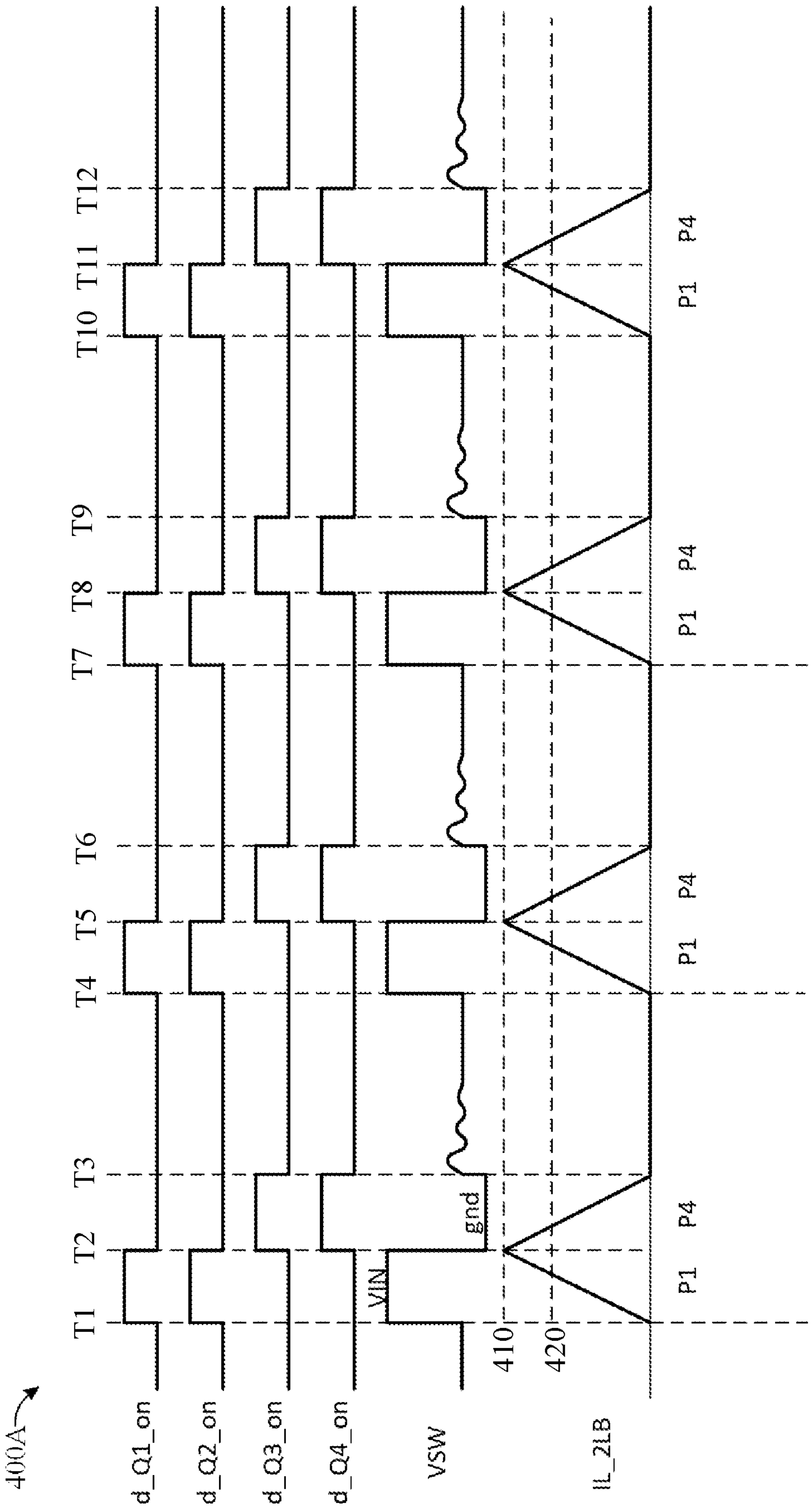
FIG. 4A is an example timing diagram of a three-level buck converter circuit operating in a two-level buck converter mode.
Figure 5A:
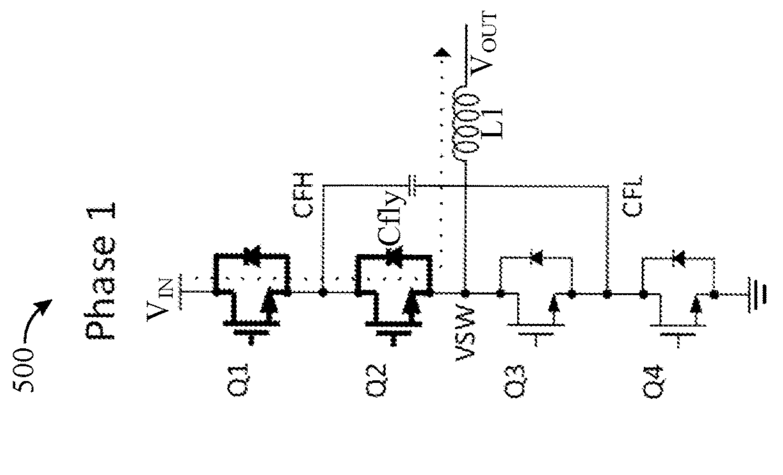
FIGS. 5A, 5B, 5C, and 5D are schematic diagrams of an example three-level buck converter circuit operated with different configurations during different phases for the two-level buck converter mode of FIG. 4A and the modified two-level buck converter mode of FIG. 4B, in accordance with certain aspects of the present disclosure.
Figure 5B:
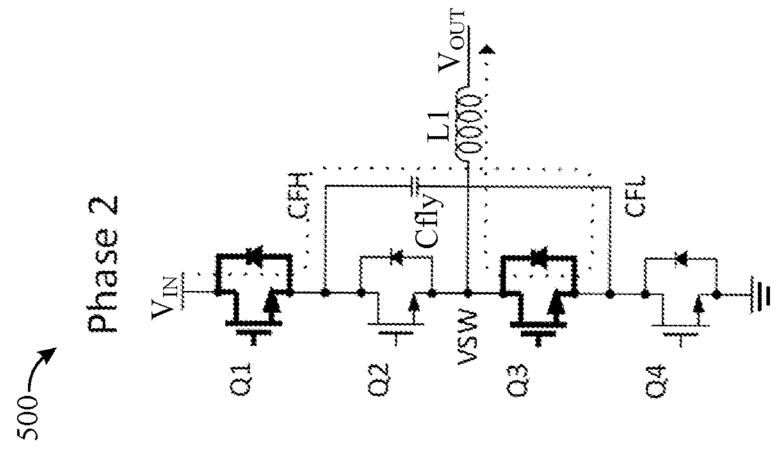
Figure 5C:
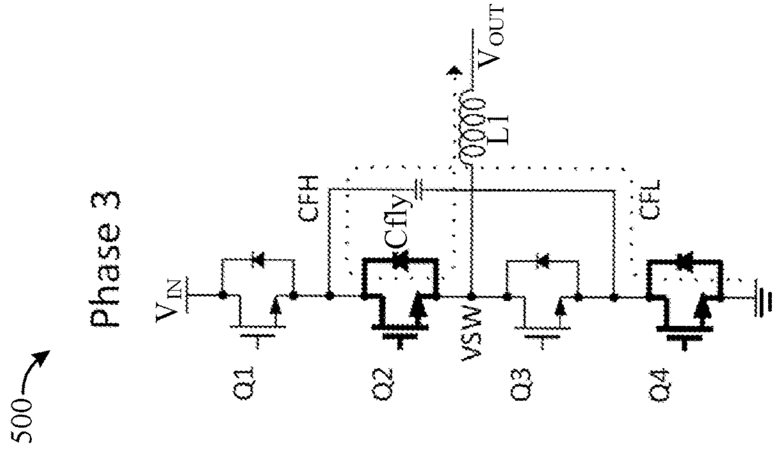
Figure 5D:
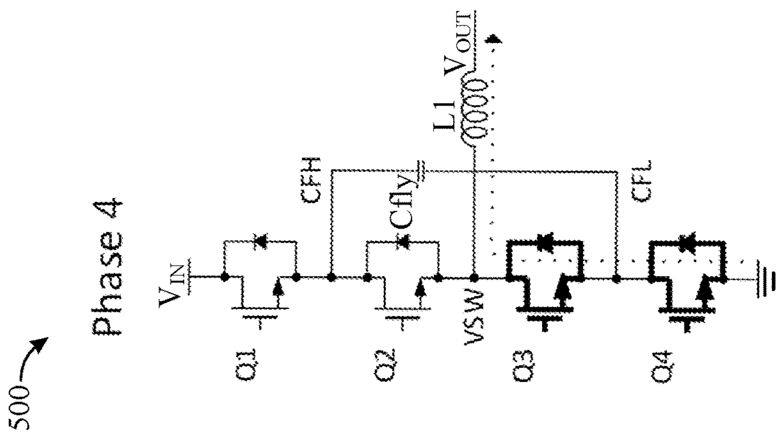

FIG. 4A is an example timing diagram 400A of a three-level buck converter circuit (e.g., in power supply circuit 300) operating in a two-level buck converter mode. FIGS. 5A and 5D are schematic diagrams of an example three-level buck converter circuit 500 operated with different configurations during different phases of the two-level buck converter mode of FIG. 4A. Therefore, FIGS. 4A, 5A, and 5D are herein described together for clarity.

Upon entering the two-level buck converter mode (e.g., when the sensed load current decreases and falls below a light load entering threshold), control logic (e.g., control logic 301) may control gate drivers (e.g., gate drivers 302, 304, 306, 308) configured to drive the transistors Q1-Q4 in the two-level buck converter mode. The control logic may effectively control the transistors Q1-Q4 to operate in the two-level buck converter mode with constant on-time (as illustrated in FIG. 4A) or with constant peak current. The two-level buck converter mode may involve alternating between two phases, referred to herein as a first phase (labeled "P1") and a fourth phase (labeled "P4"), respectively, as illustrated in FIG. 4A. In the example timing diagram 400A of FIG. 4A, the first phase P1 may occur between times T1 and T2, between times T4 and T5, between times T7 and T8, and between times T10 and T11, as illustrated. The fourth phase P4 may occur between times T2 and T3, between times T5 and T6, between times T8 and T9, and between times T11 and T12, as illustrated.

In the first phase P1 of the two-level buck converter mode, the three-level buck converter circuit is in powering mode, and the VSW node is pulled up to the power supply rail voltage (e.g., to the input voltage of the input node VIN). As shown in the timing diagram 400A, the control signal (labeled "d_Q1_on") output by the gate driver 302 (used to drive transistor Q1) and the control signal (labeled "d_Q2_on") output by the gate driver 304 (used to drive transistor Q2) are logic high. The control signal (labeled "d_Q3_on") output by the gate driver 306 (used to drive transistor Q3) and the control signal (labeled "d_Q4_on") output by the gate driver 308 (used to drive transistor Q4) are logic low. As a result, transistors Q1 and Q2 are concurrently turned on (e.g., the switches are closed), and transistors Q3 and Q4 are concurrently turned off (e.g., the switches are open), as shown in the configuration of FIG. 5A for the three-level buck converter circuit 500. In this manner, the VSW node operates with a constant voltage level at power supply rail voltage (e.g., VIN), and the current through the inductive element L1 (labeled "IL_2LB" in FIG. 4A) may be ramped up, as shown.

In the fourth phase P4 of the two-level buck converter mode, the three-level buck converter circuit is in freewheeling mode, and the VSW node is pulled down to the reference potential (e.g., to electrical ground at 0 V). As shown in the timing diagram 400A, the control signal d_Q1_on output by the gate driver 302 (used to drive transistor Q1) and the control signal d_Q2_on output by the gate driver 304 (used to drive transistor Q2) are logic low. The control signal d_Q3_on output by the gate driver 306 (used to drive transistor Q3) and the control signal d_Q4_on output by the gate driver 308 (used to drive transistor Q4) are logic high. As a result, transistors Q3 and Q4 are concurrently turned on, and transistors Q1 and Q2 are concurrently turned off, as shown in the configuration of FIG. 5D for the three-level buck converter circuit 500. In this manner, the VSW node operates with a constant voltage level at the reference potential, and the current through the inductive element L1 may be ramped down, as shown. Thus, the three-level buck converter circuit may behave as a two-level buck converter when two-level buck converter mode is enabled. Operating the three-level buck converter circuit in the two-level buck converter mode for light load conditions decreases the number of switches during a single power cycle, which may significantly reduce switching loss and increase power efficiency.

As described above, the three-level buck converter circuit may operate in the two-level buck converter with constant on-time for light load conditions. The constant on-time may be large to build up high energy on the inductive element L1, which is transferred to the VOUT node. However, due to the large constant on-time, the inductive element L1 peak current may be high (e.g., to a relatively high current level 410, as illustrated in FIG. 4A, such as 3 to 5 A), which results in increased conduction loss (e.g., in transistors Q1-Q4) and inductive element (e.g., inductive element L1) alternating current (AC) loss.

Operating the Three-Level Buck Converter Circuit in a Modified Two-Level Buck Converter Mode Certain aspects of the present disclosure operate a three-level buck converter circuit in a modified two-level buck converter mode during light load conditions. The modified two-level buck converter mode includes at least one additional phase (when compared to the two-level buck converter mode described above) configured to decrease the slope of the current through the inductive element L1. As a result, the peak current of the inductive element L1 may be lowered (e.g., to a relatively low current level 420, as illustrated in FIGS. 4A and 4B) during the modified two-level buck converter mode, and thus conduction loss (e.g., in transistors Q1-Q4) and inductive element (e.g., inductive element L1) AC loss may both be decreased for the light load conditions, with lower inductive loss than compared to the two-level buck converter mode described above.

Figure 4B:
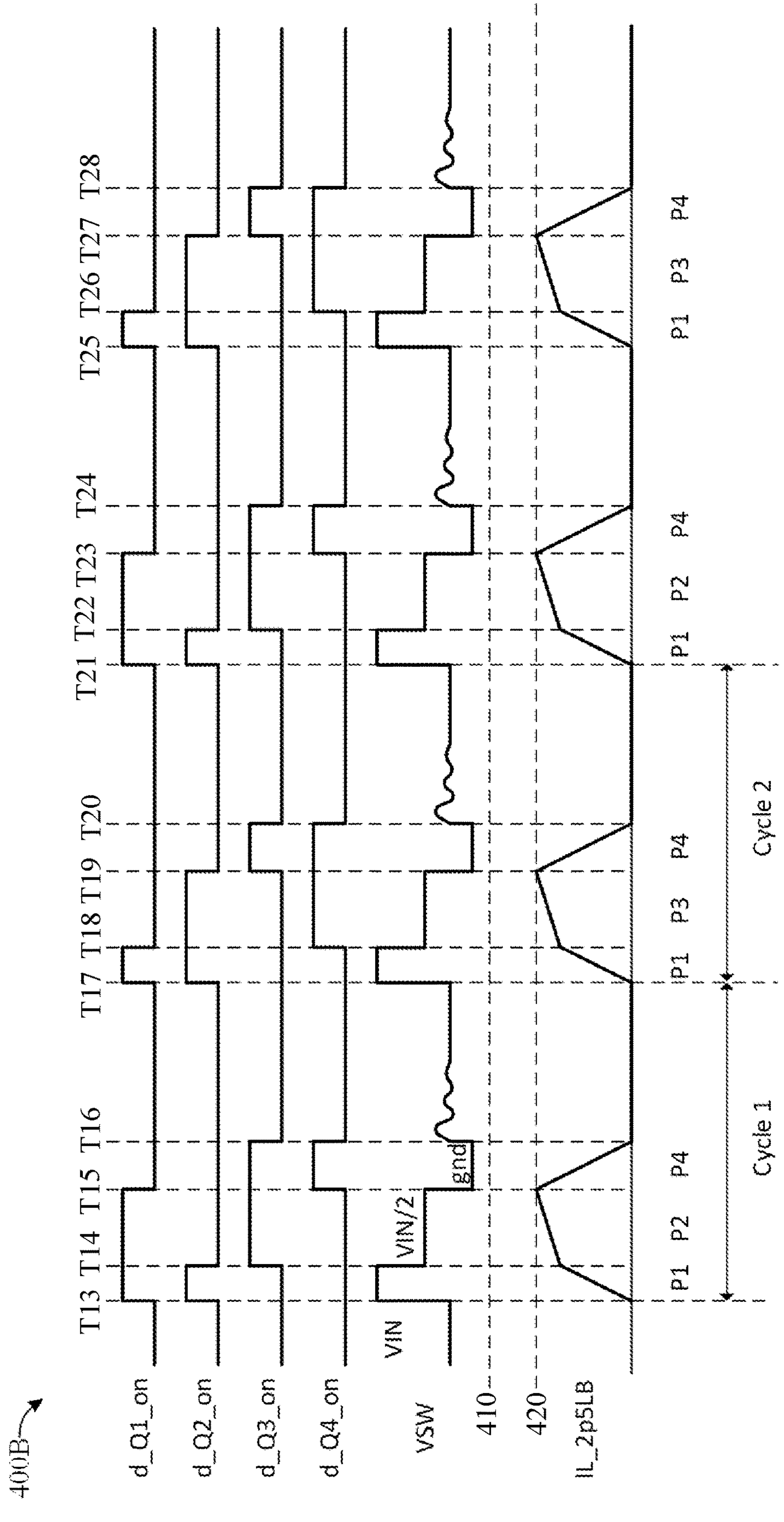
FIG. 4B is an example timing diagram of a three-level buck converter circuit operating in a modified two-level buck converter mode, in accordance with certain aspects of the present disclosure.

FIG. 4B is an example timing diagram 400B of a three-level buck converter circuit operating in a modified two-level buck converter mode, in accordance with certain aspects of the present disclosure. FIGS. 5A-5D are schematic diagrams of the three-level buck converter circuit 500 operated with different configurations during different phases of the modified two-level buck converter mode of FIG. 4B. Therefore, FIGS. 4B and 5A-5D are herein described together for clarity.

When entering the modified two-level buck converter mode (e.g., when the sensed load current decreases and falls below a light load entering threshold), control logic (e.g., control logic 301) may control gate drivers (e.g., gate drivers 302, 304, 306, 308) configured to drive the transistors Q1-Q4 in the modified two-level buck converter mode. For certain aspects, the modified two-level buck converter mode may involve alternating between a first cycle (labeled "Cycle 1") and a second cycle (labeled "Cycle 2"), whereas in other aspects, the modified two-level buck converter mode may involve using only the first cycle or only the second cycle. The first cycle may include the first phase P1 described above, a second phase (labeled "P2"), and the fourth phase P4 described above. The second cycle may include the first phase P1, a third phase (labeled "P3"), and the fourth phase P4. In the example timing diagram 400B of FIG. 4B, the first phase P1 may occur between times T13 and T14, between times T17 and T18, between times T21 and T22, and between times T25 and T26, as illustrated. The second phase P2 may occur between times T14 and T15 and between times T22 and T23, as illustrated. The third phase P3 may occur between times T18 and T19 and between times T26 and T27, as illustrated. The fourth phase P4 may occur between times T15 and T16, between times T19 and T20, between times T23 and T24, and between times T27 and T28, as illustrated.

In the first phase P1, which is described above, the three-level buck converter circuit is in powering mode (e.g., as shown in the configuration of FIG. 5A for the three-level buck converter circuit 500), the VSW node is pulled up to the power supply rail voltage (e.g., to the input voltage of the input node VIN) to operate with a first constant voltage level (e.g., VIN), and the current through the inductive element L1 may be ramped up, as shown.

In the second phase P2, the three-level buck converter circuit is in flying capacitive element (e.g., flying capacitive element Cfly) charging mode, and the VSW node is pulled down to half of the power supply rail voltage to operate with a second constant voltage level (e.g., to the input voltage of the input node VIN divided by two, labeled as "VIN/2"). As shown in the timing diagram 400B, the control signal (labeled "d_Q1_on") output by the gate driver 302 (used to drive transistor Q1) and the control signal (labeled "d_Q3_on") output by the gate driver 306 (used to drive transistor Q3) are logic high, and the control signal (labeled "d_Q2_on") output by the gate driver 304 (used to drive transistor Q2) and the control signal (labeled "d_Q4_on") output by the gate driver 308 (used to drive transistor Q4) are logic low. As a result, transistors Q1 and Q3 are concurrently turned on (e.g., the switches are closed), and transistors Q2 and Q4 are concurrently turned off (e.g., the switches are open), as shown in the configuration of FIG. 5B for the three-level buck converter circuit 500. In this manner, and due to the lower voltage at the VSW node, the current through the inductive element L1 may continue to be ramped up, but at a decreased rate (when compared to the ramp up during the first phase P1), as shown. Thus, the slope of the current through the inductive element L1 may be lower during the second phase P2 than during the first phase P1, as illustrated.

In the fourth phase P4, the three-level buck converter circuit is in freewheeling mode (e.g., as shown in the configuration of FIG. 5D for the three-level buck converter circuit 500), the VSW node is pulled down to the reference potential (e.g., to electrical ground at 0 V) to operate with a third constant voltage level (labeled "gnd") during a single cycle, and the current through the inductive element L1 may be ramped down, as shown.

Under light load conditions, the three-level buck converter circuit may operate in a discontinuous conduction mode (DCM). For example, following the completion of the fourth phase P4, the three-level buck converter circuit may operate in a configuration with all transistors Q1-Q4 turned off (all switches open) for the remaining time of the first cycle (or the second cycle), as illustrated. In this configuration, the VSW node may ring initially and may finally settle to some voltage level, as illustrated in the timing diagram of FIG. 4B.

As a counterpart to the second phase P2 in the first cycle of the modified two-level buck converter mode, the second cycle may use the third phase P3 with a different configuration for the three-level buck converter circuit. In the third phase P3, the three-level buck converter circuit is in flying capacitive element (e.g., flying capacitive element Cfly) discharging mode, and the VSW node is pulled down to half of the power supply rail voltage (e.g., to VIN/2, as shown). As shown in the timing diagram 400B, the control signal d_Q2_on output by the gate driver 304 (used to drive transistor Q2) and the control signal d_Q4_on output by the gate driver 308 (used to drive transistor Q4) are logic high, and the control signal d_Q1_on output by the gate driver 302 (used to drive transistor Q1) and the control signal d_Q3_on output by the gate driver 306 (used to drive transistor Q3) are logic low. As a result, transistors Q2 and Q4 are concurrently turned on (e.g., the switches are closed), and transistors Q1 and Q3 are concurrently turned off (e.g., the switches are open), as shown in the configuration of FIG. 5C for the three-level buck converter circuit 500. In this manner, the current through the inductive element L1 may continue to be ramped up, but at a decreased rate (when compared to the ramp up during the first phase P1), as shown. Thus, the slope of the current through the inductive element L1 may be lower during the third phase P3 than during the first phase P1. The slope of the current through the inductive element L1 may be substantially equal during the second phase P2 and during the third phase P3.

The voltage of the VSW node and the inductor-energizing behavior of the third phase P3 is similar to that of the second phase P2, but involves discharging the flying capacitive element instead of charging the flying capacitive element. By alternating between the second phase P2 and the third phase P3 in alternating cycles, charge build-up on the flying capacitive element should be avoided.

To explain, the first cycle may have the same period as the second cycle, which may be based on the switching frequency of the three-level buck converter circuit. According to certain aspects, an on-time duration of the first cycle is substantially equal to an on-time duration of the second cycle. In certain aspects, the second phase P2 and the third phase P3 may have substantially equal time length, as illustrated. In this manner, the second phase P2 and the third phase P3 in the first cycle and the second cycle, respectively, may allow for the continual balancing of the flying capacitive element (e.g., flying capacitive element Cfly) charging and discharging modes.

As introduced above, the modified two-level buck converter mode includes at least one additional phase (the second phase P2 and/or the third phase P3) configured to decrease the slope of the current through the inductive element L1. As a result, the peak current of the inductive element L1 may be lowered (e.g., to a relatively low current level 420, never reaching the relatively high current level 410, as illustrated in FIG. 4B) during the modified two-level buck converter mode, and thus inductor loss may be decreased, as compared to the two-level buck converter mode described above.

Example Power Regulation Operations

Figure 6:
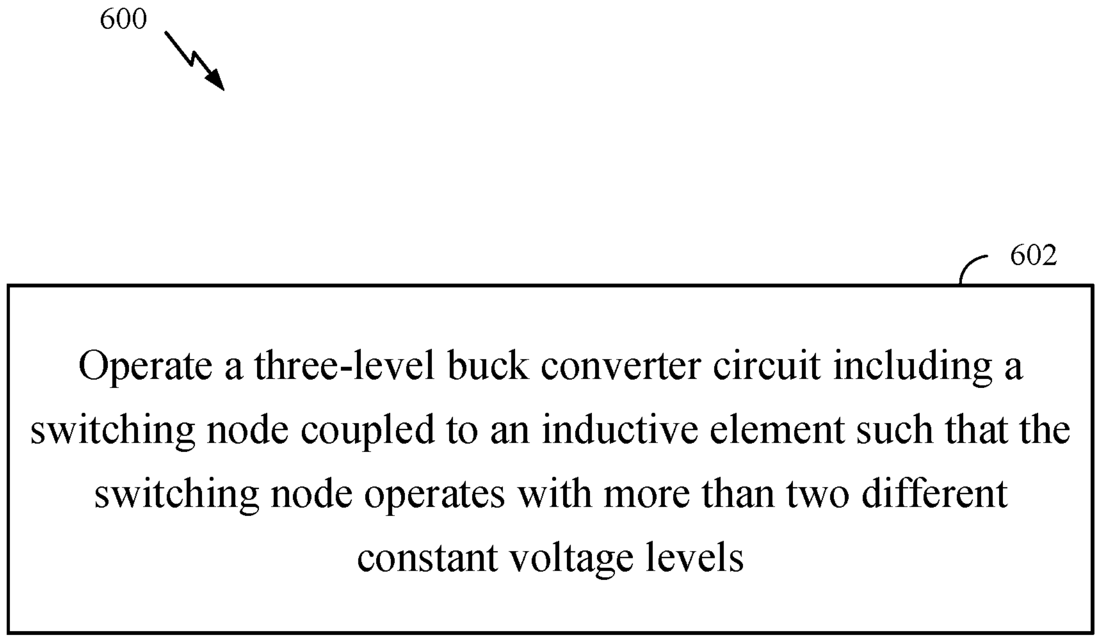
FIG. 6 is a flow diagram of example operations for regulating power, in accordance with certain aspects of the present disclosure.

FIG. 6 is a flow diagram of example operations 600 for regulating power, in accordance with certain aspects of the present disclosure. The operations 600 may be performed by a power supply circuit, such as the power supply circuit 300 of FIG. 3, with a three-level buck converter circuit (e.g., as shown in FIG. 3 and/or FIGS. 5A, 5B, 5C, and 5D). The operations 600 may be controlled by a controller or other control circuit, such as the control logic 220 of FIG. 2 or the control logic 301 of FIG. 3.

The operations 600 may begin, at block 602, by operating a three-level buck converter circuit including a switching node (e.g., the VSW node) coupled to an inductive element (e.g., inductive element L1) such that the switching node operates with more than two different constant voltage levels (e.g., VIN, VIN/2, and ground).

According to certain aspects, operating the three-level buck converter circuit at block 602 may include: (i) operating the three-level buck converter circuit in a first phase (e.g., first phase P1) such that the switching node has a first constant voltage level (e.g., VIN), (ii) operating the three-level buck converter circuit in a second phase (e.g., second phase P2) such that the switching node has a second constant voltage level (e.g., VIN/2), and (iii) operating the three-level buck converter circuit in a third phase (e.g., third phase P3) such that the switching node has a third constant voltage level (e.g., ground). In certain aspects, a current through the inductive element may have a first slope during the first phase, the current through the inductive element may have a second slope during the second phase, and the second slope may be lower than the first slope.

According to certain aspects, the three-level buck converter circuit may include a first switch (e.g., transistor Q1), a second switch (e.g., transistor Q2) coupled to the first switch via a first node (e.g., flying capacitor high node), a third switch (e.g., transistor Q3) coupled to the second switch via the switching node, a fourth switch (e.g., transistor Q4) coupled to the third switch via a second node (flying capacitor low node), and a capacitive element (e.g., flying capacitive element Cfly) coupled between the first node and the second node. In certain aspects, operating the three-level buck converter circuit at block 602 may include: (i) in a first phase (e.g., first phase P1), closing the first switch and the second switch and opening the third switch and the fourth switch, such that the switching node has a first constant voltage level (e.g., VIN), (ii) in a second phase (e.g., second phase P2), closing the first switch and the third switch and opening the second switch and the fourth switch, such that the switching node has a second constant voltage level (e.g., VIN/2), different from the first constant voltage level, (iii) in a third phase (e.g., third phase P3), closing the second switch and the fourth switch and opening the first switch and the third switch, such that the switching node has the second constant voltage level, and (iv) in a fourth phase (e.g., fourth phase P4), opening the first switch and the second switch and closing the third switch and the fourth switch, such that the switching node has a third constant voltage level (e.g., ground), different from the first and second constant voltage levels.

In certain aspects, operating the three-level buck converter circuit at block 602 may include operating the three-level buck converter circuit in a first cycle (e.g., first cycle labeled "Cycle 1") that may include the first phase, the second phase after the first phase, and the fourth phase after the second phase. In certain aspects, operating the three-level buck converter circuit at block 602 may include operating the three-level buck converter circuit in a second cycle (e.g., second cycle labeled "Cycle 2") that may include the first phase, the third phase after the first phase, and the fourth phase after the third phase, alternating between the first cycle and the second cycle. An on-time interval of the first cycle may be substantially equal to an on-time interval of the second cycle. The second phase and the third phase may have substantially equal time length.

According to certain aspects, the operations 600 may further include detecting a light load condition for the three-level buck converter circuit, and the three-level buck converter circuit may be operated such that the switching node operates with the more than two different constant voltage levels based on the detection of the light load condition.

EXAMPLE ASPECTS

In addition to the various aspects described above, specific combinations of aspects are within the scope of the disclosure, some of which are detailed below:

Aspect 1: A power supply circuit comprising: a three-level buck converter circuit including a switching node coupled to an inductive element; and a control circuit coupled to the three-level buck converter circuit and configured to control the three-level buck converter circuit such that the switching node operates with more than two different constant voltage levels.

Aspect 2: The power supply circuit of Aspect 1, wherein: the three-level buck converter circuit further includes: a first switch; a second switch coupled to the first switch via a first node; a third switch coupled to the second switch via the switching node; a fourth switch coupled to the third switch via a second node; and a capacitive element coupled between the first node and the second node; and to control the three-level buck converter circuit, the control circuit is configured to: control closure of the first switch and the second switch and control opening of the third switch and the fourth switch, in a first phase, such that the switching node has a first constant voltage level; control closure of the first switch and the third switch and control opening of the second switch and the fourth switch, in a second phase, such that the switching node has a second constant voltage level, different from the first constant voltage level; control closure of the second switch and the fourth switch and control opening of the first switch and the third switch, in a third phase, such that the switching node has the second constant voltage level; and control opening of the first switch and the second switch and control closure of the third switch and the fourth switch, in a fourth phase, such that the switching node has a third constant voltage level, different from the first and second constant voltage levels.

Aspect 3: The power supply circuit of Aspect 2, wherein in a first cycle, the control circuit is configured to control the three-level buck converter circuit in the first phase, the second phase after the first phase, and the fourth phase after the second phase.

Aspect 4: The power supply circuit of Aspect 3, wherein in a second cycle, the control circuit is configured to control the three-level buck converter circuit in the first phase, the third phase after the first phase, and the fourth phase after the third phase and wherein the control circuit is configured to alternate between the first cycle and the second cycle.

Aspect 5: The power supply circuit of Aspect 4, wherein the control circuit is configured to control the three-level buck converter circuit such that an on-time duration of the first cycle is substantially equal to an on-time duration of the second cycle.

Aspect 6: The power supply circuit of Aspect 4 or 5, wherein the control circuit is configured to control the three-level buck converter circuit such that the second phase and the third phase have substantially equal time length.

Aspect 7: The power supply circuit according to any of Aspects 2-6, wherein: the first switch comprises a first transistor that includes a source coupled to the first node and a drain coupled to an input node of the three-level buck converter circuit; the second switch comprises a second transistor that includes a drain coupled to the first node and a source coupled to the switching node; the third switch comprises a third transistor that includes a drain coupled to the switching node and a source coupled to the second node; and the fourth switch comprises a fourth transistor that includes a drain coupled to the second node and a source coupled to a reference potential node of the power supply circuit.

Aspect 8: The power supply circuit according to any of Aspects 2-7, wherein the first constant voltage level is based on an input voltage for the power supply circuit, wherein the second constant voltage level is one-half the first constant voltage level, and wherein the third constant voltage level is a ground voltage for the power supply circuit.

Aspect 9: The power supply circuit according to any of Aspects 2-8, wherein the control circuit is configured to control the three-level buck converter circuit such that a current through the inductive element has a first slope during the first phase, the current through the inductive element has a second slope during the second phase, and the second slope is lower than the first slope.

Aspect 10: The power supply circuit according to any of Aspects 1-9, wherein the control circuit is configured to control the three-level buck converter circuit such that the switching node operates with the more than two different constant voltage levels when the three-level buck converter circuit is operating in a light load condition.

Aspect 11: The power supply circuit according to any of Aspects 1-10, wherein the control circuit is configured to control the three-level buck converter circuit such that the switching node operates with three different constant voltage levels.

Aspect 12: A method of regulating power, the method comprising operating a three-level buck converter circuit including a switching node coupled to an inductive element such that the switching node operates with more than two different constant voltage levels.

Aspect 13: The method of Aspect 12, wherein operating the three-level buck converter circuit comprises: operating the three-level buck converter circuit in a first phase such that the switching node has a first constant voltage level; operating the three-level buck converter circuit in a second phase such that the switching node has a second constant voltage level; and operating the three-level buck converter circuit in a third phase such that the switching node has a third constant voltage level.

Aspect 14: The method of Aspect 13, wherein a current through the inductive element has a first slope during the first phase, wherein the current through the inductive element has a second slope during the second phase, and wherein the second slope is lower than the first slope.

Aspect 15: The method according to any of Aspects 12-14, wherein: the three-level buck converter circuit further includes: a first switch; a second switch coupled to the first switch via a first node; a third switch coupled to the second switch via the switching node; and a fourth switch coupled to the third switch via a second node; a capacitive element coupled between the first node and the second node; and operating the three-level buck converter circuit comprises: in a first phase, closing the first switch and the second switch and opening the third switch and the fourth switch, such that the switching node has a first constant voltage level; in a second phase, closing the first switch and the third switch and opening the second switch and the fourth switch, such that the switching node has a second constant voltage level, different from the first constant voltage level; in a third phase, closing the second switch and the fourth switch and opening the first switch and the third switch, such that the switching node has the second constant voltage level; and in a fourth phase, opening the first switch and the second switch and closing the third switch and the fourth switch, such that the switching node has a third constant voltage level, different from the first and second constant voltage levels.

Aspect 16: The method of Aspect 15, wherein operating the three-level buck converter circuit further comprises operating the three-level buck converter circuit in a first cycle that comprises the first phase, the second phase after the first phase, and the fourth phase after the second phase.

Aspect 17: The method of Aspect 16, wherein operating the three-level buck converter circuit further comprises operating the three-level buck converter circuit in a second cycle that comprises the first phase, the third phase after the first phase, and the fourth phase after the third phase, alternating between the first cycle and the second cycle.

Aspect 18: The method of Aspect 17, wherein an on-time interval of the first cycle is substantially equal to an on-time interval of the second cycle.

Aspect 19: The method of Aspect 17 or 18, wherein the second phase and the third phase have substantially equal time length.

Aspect 20: The method according to any of Aspects 12-19, further comprising detecting a light load condition for the three-level buck converter circuit, wherein the three-level buck converter circuit is operated such that the switching node operates with the more than two different constant voltage levels based on the detection of the light load condition.

Additional Considerations

The various operations of methods described above may be performed by any suitable means capable of performing the corresponding functions. The means may include various hardware and/or software component(s) and/or module (s), including, but not limited to a circuit, an application-specific integrated circuit (ASIC), or processor. Generally, where there are operations illustrated in figures, those operations may have corresponding counterpart means-plus-function components with similar numbering.

As used herein, the term “determining” encompasses a wide variety of actions. For example, “determining” may include calculating, computing, processing, deriving, investigating, looking up (e.g., looking up in a table, a database, or another data structure), ascertaining, and the like. Also, “determining” may include receiving (e.g., receiving information), accessing (e.g., accessing data in a memory), and the like. Also, “determining” may include resolving, selecting, choosing, establishing, and the like.

As used herein, a phrase referring to “at least one of” a list of items refers to any combination of those items, including single members. As an example, “at least one of: a, b, or c” is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation, and details of the methods and apparatus described above without departing from the scope of the claims.

What is claimed is:

1. A power supply circuit comprising:
- a three-level buck converter circuit including:
  - a switching node coupled to an inductive element;
  - a first switch;
  - a second switch coupled to the first switch via a first node;
  - a third switch coupled to the second switch via the switching node;
  - a fourth switch coupled to the third switch via a second node; and
  - a capacitive element coupled between the first node and the second node; and
- a control circuit coupled to the three-level buck converter circuit and configured to control the three-level buck converter circuit such that the switching node operates with more than two different constant voltage levels, wherein to control the three-level buck converter circuit, the control circuit is configured to:
  - control closure of the first switch and the second switch and control opening of the third switch and the fourth switch, in a first phase, such that the switching node has a first constant voltage level;
  - control closure of the first switch and the third switch and control opening of the second switch and the fourth switch, in a second phase, such that the switching node has a second constant voltage level, different from the first constant voltage level;
  - control closure of the second switch and the fourth switch and control opening of the first switch and the third switch, in a third phase, such that the switching node has the second constant voltage level; and
  - control opening of the first switch and the second switch and control closure of the third switch and the fourth switch, in a fourth phase, such that the switching node has a third constant voltage level, different from the first and second constant voltage levels.

2. The power supply circuit of claim 1, wherein the control circuit is configured to control the three-level buck converter circuit such that a current through the inductive element has at least three different non-zero slopes.

3. The power supply circuit of claim 1, wherein in a first cycle, the control circuit is configured to control the three-level buck converter circuit in the first phase, the second phase after the first phase, and the fourth phase after the second phase.

4. The power supply circuit of claim 3, wherein in a second cycle, the control circuit is configured to control the three-level buck converter circuit in the first phase, the third phase after the first phase, and the fourth phase after the third phase and wherein the control circuit is configured to alternate between the first cycle and the second cycle.

5. The power supply circuit of claim 4, wherein the control circuit is configured to control the three-level buck converter circuit such that an on-time duration of the first cycle is substantially equal to an on-time duration of the second cycle.

6. The power supply circuit of claim 4, wherein the control circuit is configured to control the three-level buck converter circuit such that the second phase and the third phase have substantially equal time length.

7. The power supply circuit of claim 1, wherein:
- the first switch comprises a first transistor that includes a source coupled to the first node and a drain coupled to an input node of the three-level buck converter circuit;
- the second switch comprises a second transistor that includes a drain coupled to the first node and a source coupled to the switching node;
- the third switch comprises a third transistor that includes a drain coupled to the switching node and a source coupled to the second node; and the fourth switch comprises a fourth transistor that includes a drain coupled to the second node and a source coupled to a reference potential node of the power supply circuit.

8. The power supply circuit of claim 1, wherein the first constant voltage level is based on an input voltage for the power supply circuit, wherein the second constant voltage level is one-half the first constant voltage level, and wherein the third constant voltage level is a ground voltage for the power supply circuit.

9. The power supply circuit of claim 1, wherein the control circuit is configured to control the three-level buck converter circuit such that a current through the inductive element has a first slope during the first phase, the current through the inductive element has a second slope during the second phase, and the second slope is lower than the first slope.

10. A method of regulating power, the method comprising operating a three-level buck converter circuit including a switching node coupled to an inductive element such that the switching node operates with more than two different constant voltage levels, wherein:

the three-level buck converter circuit further includes:

a first switch;

a second switch coupled to the first switch via a first node;

a third switch coupled to the second switch via the switching node; and a fourth switch coupled to the third switch via a second node;

a capacitive element coupled between the first node and the second node; and operating the three-level buck converter circuit comprises:

in a first phase, closing the first switch and the second switch and opening the third switch and the fourth switch, such that the switching node has a first constant voltage level;

in a second phase, closing the first switch and the third switch and opening the second switch and the fourth switch, such that the switching node has a second constant voltage level, different from the first constant voltage level;

in a third phase, closing the second switch and the fourth switch and opening the first switch and the third switch, such that the switching node has the second constant voltage level; and in a fourth phase, opening the first switch and the second switch and closing the third switch and the fourth switch, such that the switching node has a third constant voltage level, different from the first and second constant voltage levels.

11. The method of claim 10, wherein a current through the inductive element has a first slope during the first phase, wherein the current through the inductive element has a second slope during the second phase, and wherein the second slope is lower than the first slope.

12. The method of claim 10, wherein operating the three-level buck converter circuit further comprises operating the three-level buck converter circuit in a first cycle that comprises the first phase, the second phase after the first phase, and the fourth phase after the second phase.

13. The method of claim 12, wherein operating the three-level buck converter circuit further comprises operating the three-level buck converter circuit in a second cycle that comprises the first phase, the third phase after the first phase, and the fourth phase after the third phase, alternating between the first cycle and the second cycle.

14. The method of claim 13, wherein an on-time interval of the first cycle is substantially equal to an on-time interval of the second cycle.

15. The method of claim 13, wherein the second phase and the third phase have substantially equal time length.

16. The method of claim 10, further comprising detecting a light load condition for the three-level buck converter circuit, wherein the three-level buck converter circuit is operated such that the switching node operates with the more than two different constant voltage levels based on the detection of the light load condition.

17. The method of claim 10, wherein a current through the inductive element has at least three different non-zero slopes.

18. A power supply circuit comprising:

a three-level buck converter circuit including a switching node coupled to an inductive element; and a control circuit coupled to the three-level buck converter circuit and configured to control the three-level buck converter circuit such that the switching node operates with more than two different constant voltage levels, wherein the control circuit is configured to control the three-level buck converter circuit such that the switching node operates with the more than two different constant voltage levels when the three-level buck converter circuit is operating in a light load condition.

* * * * *